United States Patent [19]

Nakanishi

[11] Patent Number: 5,149,604
[45] Date of Patent: Sep. 22, 1992

[54] BATTERY ACCOMMODATING STRUCTURE

[75] Inventor: Hiroaki Nakanishi, Tokyo, Japan

[73] Assignee: Casio Computer Co. Ltd., Japan

[21] Appl. No.: 655,680

[22] Filed: Feb. 14, 1991

[30] Foreign Application Priority Data

Feb. 20, 1990 [JP] Japan ................................. 2-37232

[51] Int. Cl.$^5$ ............................................ H01M 2/10
[52] U.S. Cl. ...................................... 429/97; 429/99
[58] Field of Search .................................. 429/97, 99

[56] References Cited

U.S. PATENT DOCUMENTS

| 4,161,568 | 7/1979 | Lund | 429/99 |
| 4,230,777 | 10/1980 | Gatto | 429/97 |
| 5,039,580 | 8/1991 | Mori et al. | 429/97 |

FOREIGN PATENT DOCUMENTS 62-69367  5/1987  Japan .

Primary Examiner—Stephen Kalafut

[57] ABSTRACT

A battery accommodating structure for accommodating first and second batteries in such a way that they are fixed in its accommodating portions by two pressing plates different from each other. A moving member which allows the two different pressing plates to be detached is provided to move in response to the movement of a power switch of an appliance which uses the accommodating structure. When the moving member is located at a position where the power switch is turned on, it prevent both of the first and second batteries from being removed from the accommodating portions, but when it is located at another position where the power switch is turned off, it allows one of the first and second batteries to be removed from the corresponding accommodating portion.

7 Claims, 7 Drawing Sheets

BATTERY ACCOMMODATING STRUCTURE

BACKGROUND OF THE INVENTION

1. Field of the Invention

The present invention relates to a battery accommodating structure in a small-sized electronic appliances such as a small-sized electronic calculator, etc.

2. Description of the Related Art

The small-sized electronic appliances such as the small-sized electronic calculator usually use batteries for their power source. These batteries are exchangeably accommodated in a battery accommodating portion formed in each of appliance cases.

The small-sized electronic appliance provided with memory means has a battery for its main circuit and a backup battery for its memory. When the battery for the main circuit is to be exchanged with a new one, the memory backup battery backs up the memory means not to erase date stored in the memory means.

In the case of the small-sized electronic appliance which uses two or more batteries for its main circuit, the remaining battery or batteries back up its memory means even when one or more of the batteries is detached from the battery accommodating portion.

In the case of the conventional small-sized electronic appliances of this type, however, plural batteries are only accommodated in the battery accommodating portion in each of appliance cases and only their handling manual teach how to exchange the batteries with new ones. In the exchanging process of the batteries with new ones, therefore, all of the batteries are sometimes simultaneously detached from the appliance case to thereby erase all data stored in the memory means.

SUMMARY OF THE INVENTION

The present invention is deribed from the above-mentioned situation, and the object of the present invention is therefore to provide a battery accommodating structure which can prevent all of plural batteries used from being simultaneously detached from it.

This object of the present invention can be achieved by a battery accommodating structure comprising: a casing; first and second means constructed by recesses formed in the casing, for accommodating batteries; first and second plate members detachably attached to the casing to prevent the batteries from being removed from the first and second battery accommodating means; and release means movable between a first position where the first plate member can be detached from the casing and a second position where the second plate member can be detached from the casing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

Figure 1:
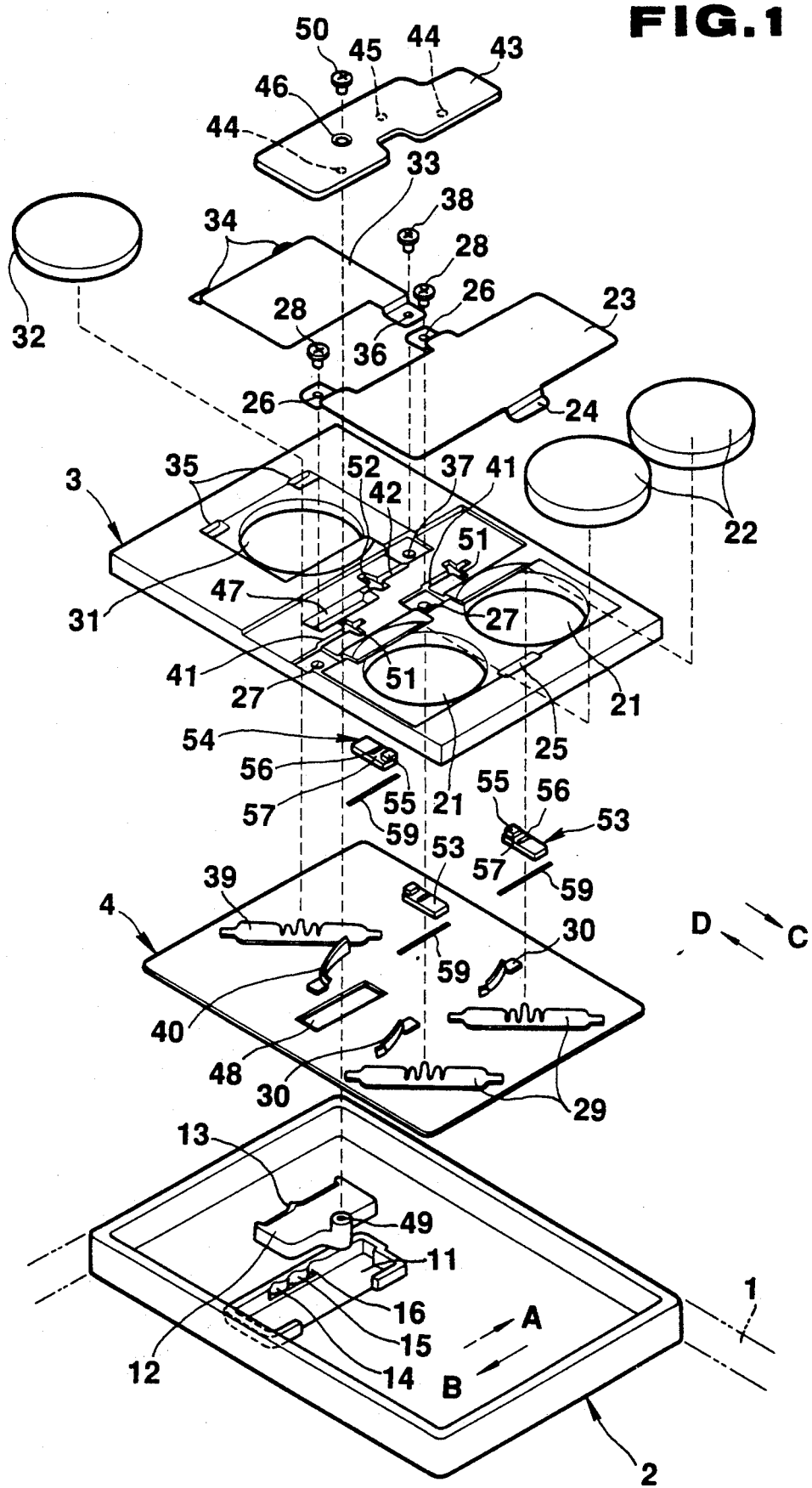
FIG. 1 is an exploded perspective view schematically showing a main portion of a first embodiment of a battery accommodating structure of the present invention.

FIG. 1 schematically shows a main portion of a first embodiment of a battery accommodating structure according to the present invention.

According to this battery accommodating structure, an intermediate case 3 is mounted in an upper case 2 arranged on the back surface (upper surface in FIG. 1) of an appliance case 1, and a circuit board 4 is interposted between them.

A slider accommodating portion 11 is formed in an inner surface of the upper case 2. A slider 12 for switching on and off a power source is accommodated in the slider accommodating portion 11 to be freely slidable in directions A and B. The slider 12 has an elastically deformable engaging projection 13. When this engaging projection 13 is engaged with one of three V-shaped grooves 14, 15 and 16 formed in the slider accommodating portion 11, the slider 12 is located at one of center, (A) direction moved, and (B) direction moved positions. A movable contact (not shown) for a power source switch is mounted on a surface of the slider 12 which is opposed to the circuit board 4, and a fixed contact (not shown) for the power source switch is mounted at an area of the circuit board 4 which is opposed to the movable contact of the slider 12.

In the right half of the intermediate case 3 two first battery accommodating holes 21 are mounted. Two button-type batteries 22 for the main circuit are accommodated in these first battery accommodating holes 21 with them being pressed by a battery pressing plate 23.

The battery pressing plate 23 is attached to the intermediate case 3 by screwing two screws 28 into two corresponding screw holes 27 of the intermediate case 3 through its two screw inserted holes 26 while its engaging piece 24 is engaged with an engaged hole 25 of the intermediate case 3. A positive terminal (one side surface) of the button-type battery 22 for the main circuit is electrically connected to the circuit board 4 through a positive plate 29 located in the center of each first battery accommodating holes 21. A negative terminal (circumferential surface) of the button-type battery 22 for the main circuit is electrically connected to the circuit board 4 through a negative plate 30 mounted as a cantilever at a predetermined position on a circumferential wall portion of each first battery accommodating holes 21.

In the left half of the intermediate case 3, a second battery accommodating hole 31 is mounted. A button-type battery 32 for memory backup is accommodated in the second battery accommodating hole 31 with it being pressed by a battery pressing plate 33. The battery pressing plate 33 is attached to the intermediate case 3 by screwing a screw 38 into a corresponding screw hole 37 of the intermediate case 3 through a screw inserted hole 36 of the plate 33 while its two engaging pieces 34 are engaged with their corresponding two engaged holes 35 of the intermediate case 3. A positive terminal (one side surface) of the memory backup button-type battery 32 is electrically connected to the circuit board 4 through a positive plate 39 located in the center of the second battery accommodating hole 31. A negative terminal (circumferential surface) of the memory backup button-type battery 32 is electrically connected to the circuit board 4 through a negative plate 40 mounted as a cantilever at a predetermined position on the circumferential wall portion of the second battery accommodating hole 31.

Two first guide grooves 41 and a second guide groove 42 which extend in the directions A and B are formed at a region between the two first battery accommodating holes 21 and the second battery accommodating hole 31 in the center of the back surface (upper surface in FIG. 1) of the intermediate case 3. Two first pins 44 and a second pin 45 which are mounted on a screw blinding plate (or movable member) 43 are freely slidably inserted into the two first guide grooves 41 and the second guide groove 42. The screw blinding plate 43 is attached to the slider 12 by a screw 50 which is screwed into a screw hole 49 of the electric power source switching slider 12 through a screw insertion hole 46 of the blind plate 43, a through hole 47 of the case 3 and a through hole 48 of the circuit board 4. The screw blinding plate 43 is thus slid together with the slider 12. It is preferable that the head of the screw 50 is coated with cement or the like, or a screw driver engaging slot on the head of the screw 50 is broken to prevent the screw 50 from being detached after it is screwed into the screw hole 49 of the slider 12.

Figure 2:
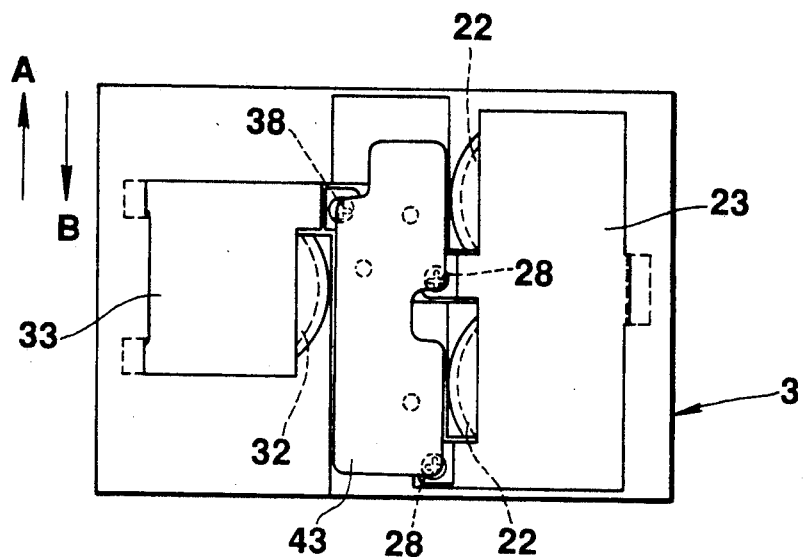
FIG. 2 is a plan view schematically showing a state in which a screw blinding plate is located at a battery unexchangable position in the main portion of FIG. 1.

When the slider 12 is located at the center position, as shown in FIG. 2, the screw binding plate 43 covers the two screws 28, which fix the battery pressing plate 23 to press the two button-type batteries 22 for the main circuit, and prevents these two screws 28 from being unscrewed from the screw holes 27 of the intermediate case 3. The screw blinding plate 23 is also covers the screw 38, which fixes the battery pressing plate 33 to press the memory backup button-type battery 32, to prevent the screw 38 from being unscrewed from the screw hole 37 of the intermediate case 3. That is, the above described center position is a battery unexchangable position.

Figure 3:
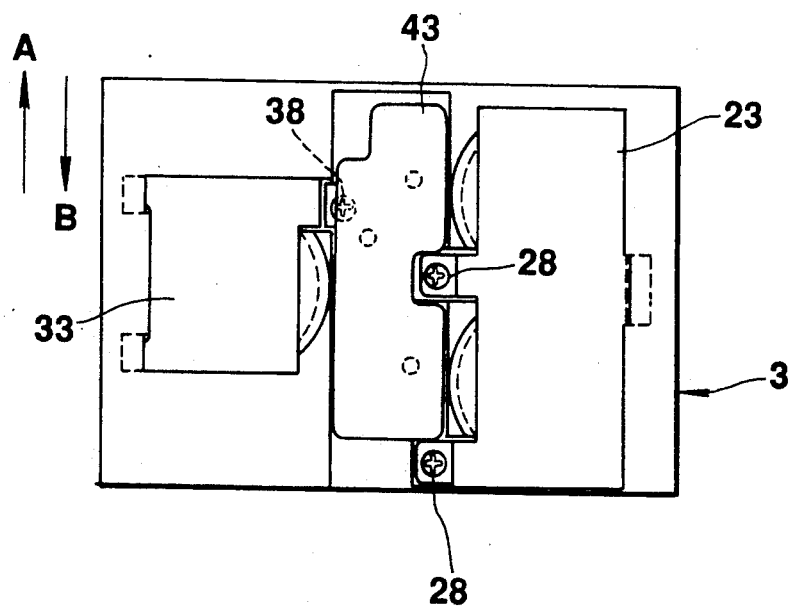
FIG. 3 is a plan view schematically showing a state in which the screw blinding plate is located at a main circuit battery exchangable position in the main portion of FIG. 1.

When the slider 12 is located at the (A) direction moved portion, as shown in FIG. 3, the screw blinding pate 43 is removed over the two screws 28 for fixing the battery pressing plate 23 so that the two screws 28 can be unscrewed from the screw holes 27. At this time, the screw blinding plate 43 covers only the screw 38 for fixing the batter pressing plate 33 so that the screw 38 can not be unscrewed from the screw hole 37. That is, the above described (A) direction moved position is a main circuit battery exchangable position.

Figure 5:
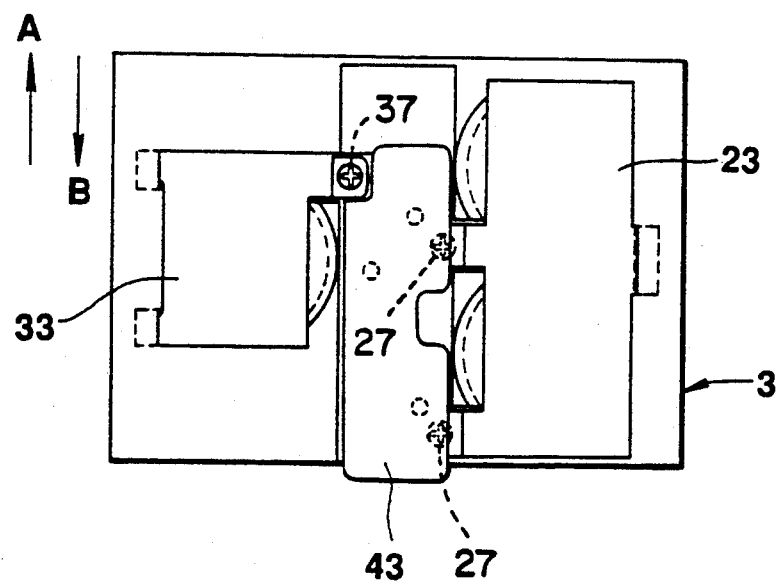
FIG. 5 is a plan view schematically showing a state in which the screw blinding plate is located at a memory-backup batter exchangeable position in the main portion of FIG. 1.

When the slider 12 is located at the (B) direction moved position, as shown in FIG. 5, the screw blinding plate 43 covers the two screws 28 for fixing the battery pressing plate 23 so that the two screws 28 can not be unscrewed from the screw holes 27. At this time, the screw bliding plate 43 is removed over the screw 38 for fixing the battery pressing plate 33 so that the screw 38 can be unscrewed from the screw hole 37.

That is, the above described (B) direction moved position is a memory backup battery exchangable position.

Figure 7:
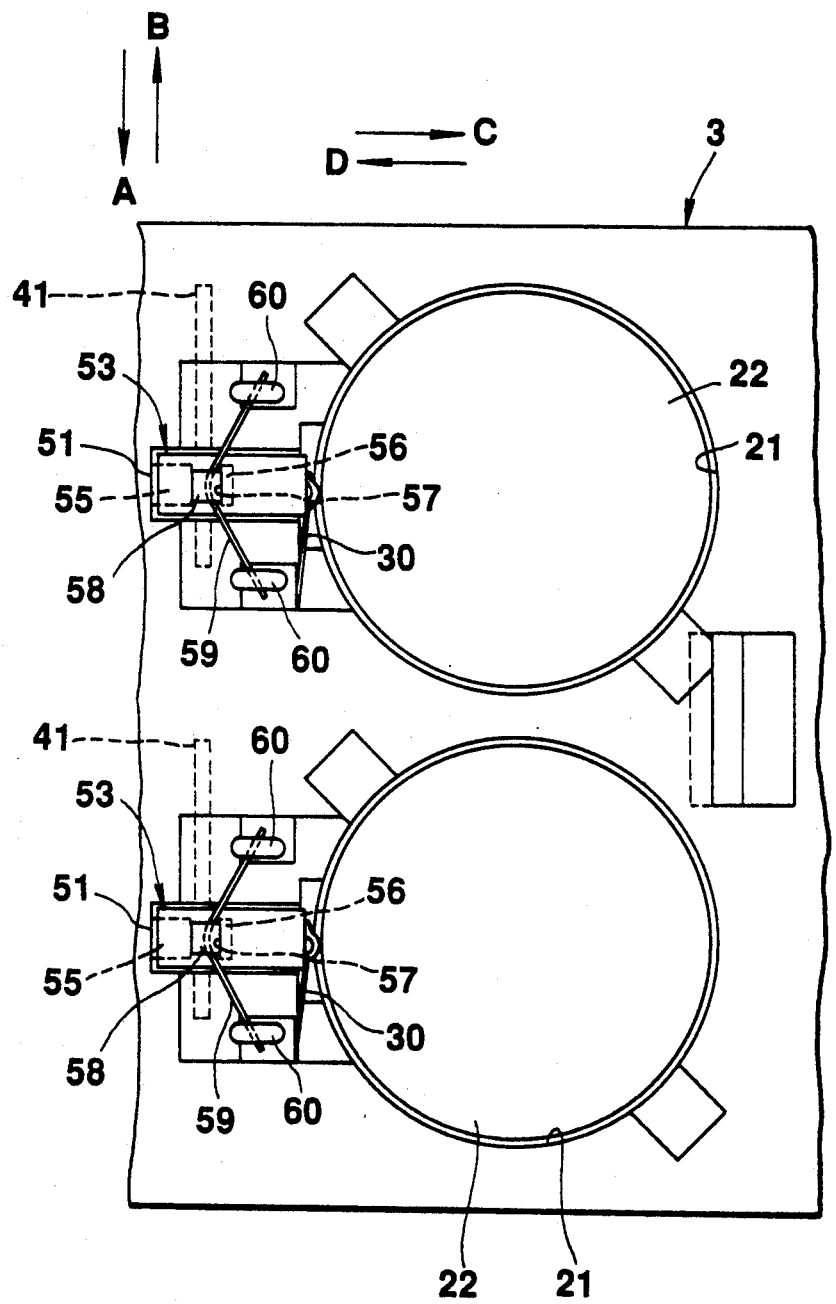
FIG. 7 is an enlarged bottom view schematically showing two accommodating portions for accommodating the two button-type batteries for the main circuit in the main portion of FIG. 1.
Figure 8:
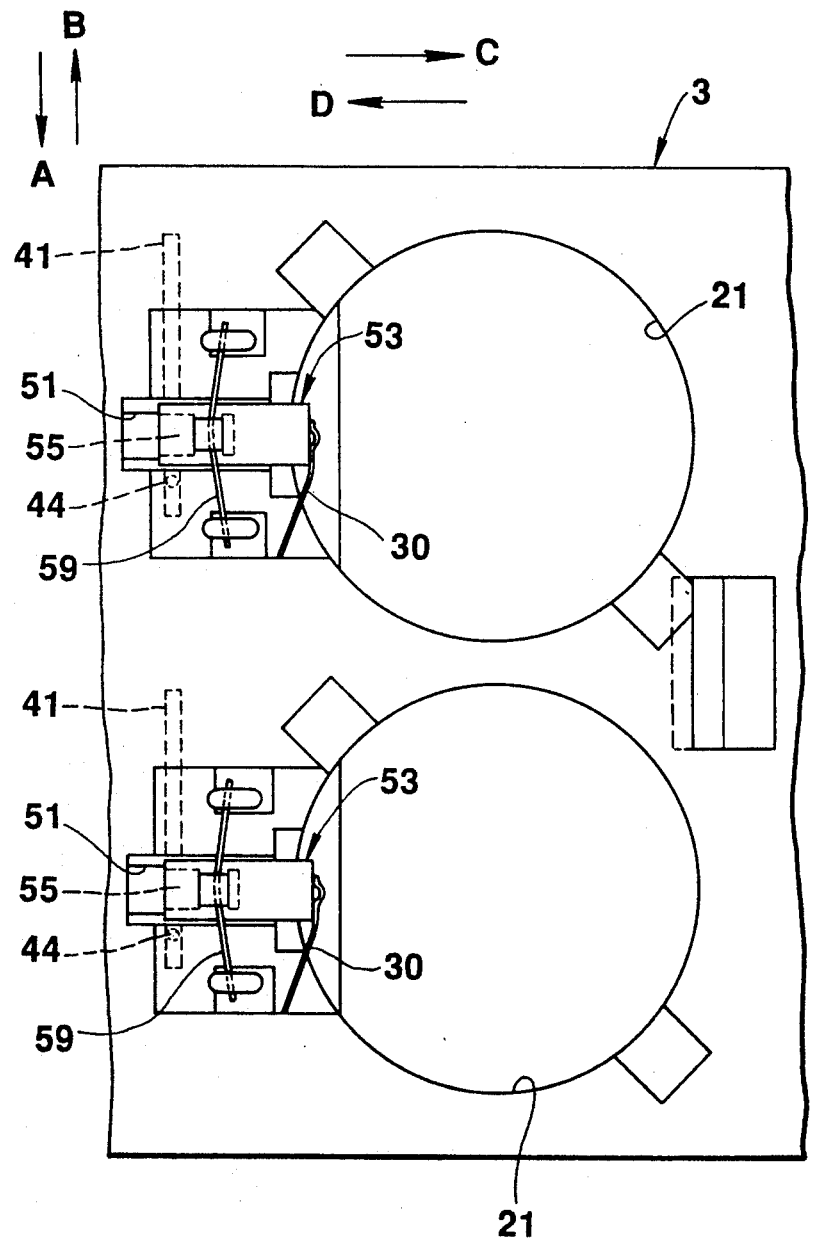
FIG. 8 is an enlarged bottom view schematically showing a state in which the two button-type batteries for the main circuit are detached from the two battery accommodating portion of FIG. 7.

As shown in FIGS. 1, 7 and 8, two first guide holes 51, which cross the two first guide grooves 41 at right angle and extend in the center direction of their corresponding battery accommodating holes 21, and a second guide hole 52, which crosses the second guide groove 42 and extends in the center direction of the corresponding battery accommodating hole 31, are formed at predetermined three positions in the center portion of the intermediate case 3. First and second lock members 53 and 54 are engaged with the first and second guide holes 51 and 52 so that the lock members 53, 54 are freely slidable in directions C and D. Two projections 55 and 56 are mounted on the upper surface (lower surface in FIG. 7) of each of the first and second lock members 53 and 54 in FIG. 1, and a groove 57 is formed between these two projections 55 and 56 in each lock member 53 or 54. A projection 58 is formed on the lower surface (upper surface in FIG. 7) of each of the first and second lock members 53 and 54 in FIG. 1. A spring rod 59 is inserted through each of the projections 58. Both ends of each of the spring rods 59 are engaged with engaged portions 60 mounted on the lower surface (upper surface in FIG. 7) of the intermediate case 3 in FIG. 1.

Each of the first lock members 53 is urged in the direction C by the urging force of the spring rod 59 and the free end of the negative plate 30 for the main circuit button-type battery 22 is thus urged in the direction C by the C direction side end surface of the first lock member 53. When the two button-type batteries 22 for the main circuit are accommodated in the two first battery accommodating holes 21, the circumferential surfaces of the two button-type batteries 22 urge the free ends of the corresponding negative plates 30 so that the first lock members 53 are moved in the direction D against the urging force of the spring rods 59 to align the grooves 57 of the first lock members 53 with their corresponding first guide grooves 41, as shown in FIG. 7. When the two button-type batteries 22 for the main circuit are not accommodated in the two first battery accommodating holes 21, the two first lock members 53 are moved in the direction C by the urging force of the spring rods 59 so that the projections 55 on the first lock members 53 shut off the corresponding first guide grooves 41, as shown in FIG. 8.

The second lock member 54 is urged in the direction D by the urging force of the spring rod 59 and the free end of the negative plate 40 for the memory backup button-type battery 22 is thus urged in the direction D by the D direction side end surface of the second lock member 54. When the memory backup button-type battery 32 is accommodated in the second battery accommodating hole 31, the circumferential surface of the button-type battery 32 urges the free end of the negative plate 40 so that the second lock member 54 is moved in the direction C against the urging force of the spring rod 59 to align the groove 57 of the second lock member 54 with the second guide groove 42. When the memory backup button-type battery 32 is not accommodated in the second battery accommodating hole 31, the second lock member 54 is moved in the direction D by the urging force of the spring rod 59 so that the projection 55 on the second lock member 54 shuts off the second guide groove 42.

In one embodiment of the battery accommodating structure of this invention, having the above-described arrangement, the power switching slider 12 is usually located at the center position (battery unexchangeable position) when the two button-type batteries 22 for the main circuit are accommodated in the two first battery accommodating holes 21 and the memory backup button-type battery 32 is accommodated in the second battery accommodating hole 31. In this situation, the heads of the all screws 28 and 38 which serve to fix the battery pressing plates 23 and 33 are covered by the screw blinding plate 43, as shown in FIG. 2, thereby making it impossible to unscrew the screws 28 and 38. Therefore, the two button-type batteries 22 for the main circuit and the memory backup button-type battery 32 cannot be exchanged with new ones.

When the power switching slider 12 is located at the center position (battery unexchangeable position), the power switch of the small-sized electronic appliance such as the small-sized electronic calculator having the above described battery accommodating structure is turned on, and current is supplied from the two button-type batteries 22 for the main circuit to the control and memory portions (not shown) of the electronic appliance.

When the power switching slider 12 is located at the (A) or (B) direction moved position, the power switch is turned off, and the two button-type batteries 22 for the main circuit is shut off from the control portion while supplying current to the memory portion. Needless to say, the memory backup button-type battery 32 is connected at all times to the memory portion whichever position the slider 12 may be located at, and the electric circuit in the small-sized electronic appliance is so constructed as that the voltage of current supplied from the two button-type batteries 22 to the memory portion becomes lower than a predetermined value, the memory backup button-type battery 32 automatically backs up the memory portion to protect data stored in the memory portion.

When the two button-type batteries 22 for the main circuit are to be exchanged with new ones in the case of this battery accommodating structure, the power switching slider 12 connected to the screw blinding plate 43 is slid to the (A) direction moved position (or main circuit battery exchangeable position). In this state, as shown in FIG. 3, the screw blinding plate 43 is removed from over the two screws 28, which serve to fix the battery pressing plate 23, so that the two screws 28 can be unscrewed, and the blinding plate 43 is still covering the screw 38 which serves to fix the battery pressing plate 33. When the power switching slider 12 is located at the (A) direction moved position, the aferementioned power switch is turned off so that the two button-type batteries 22 are shut off from the control portion.

Figure 4:
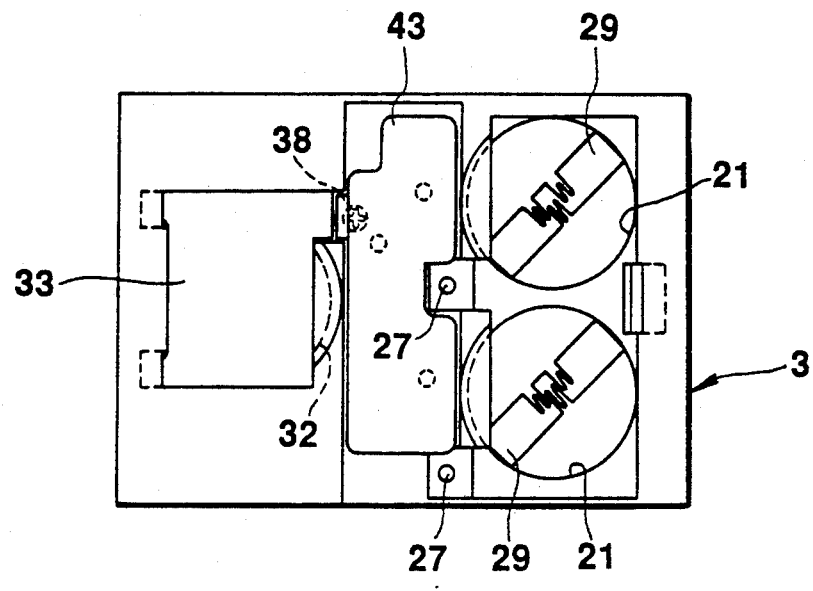
FIG. 4 is a plan view schematically showing a state in which button-type batteries for the main circuit are detached from the battery accommodating structure of FIG. 3.

Next, the two screws 28 are unscrewed and the battery pressing plate 23 is detached from the intermediate case 3, so that the two button-type batteries 22 for the main circuit can be exchanged with new ones, as shown in FIG. 4. When the two button-type batteries 22 are removed from their accommodating holes 21, current is supplied from the memory backup button-type battery 32 to the memory portion to back up the memory portion. As shown in FIG. 8, the two first lock members 53 which correspond to the first battery accommodating holes 21 for the two button-type batteries 22 are moved in the direction C by the urging force of the spring rods 59, so that the projections 55 on the first lock members 53 shut off their corresponding first guide grooves 41, under the situation that the two button-type batteries 22 for the main circuit are detached from their corresponding accommodating holes 21.

Figure 9:
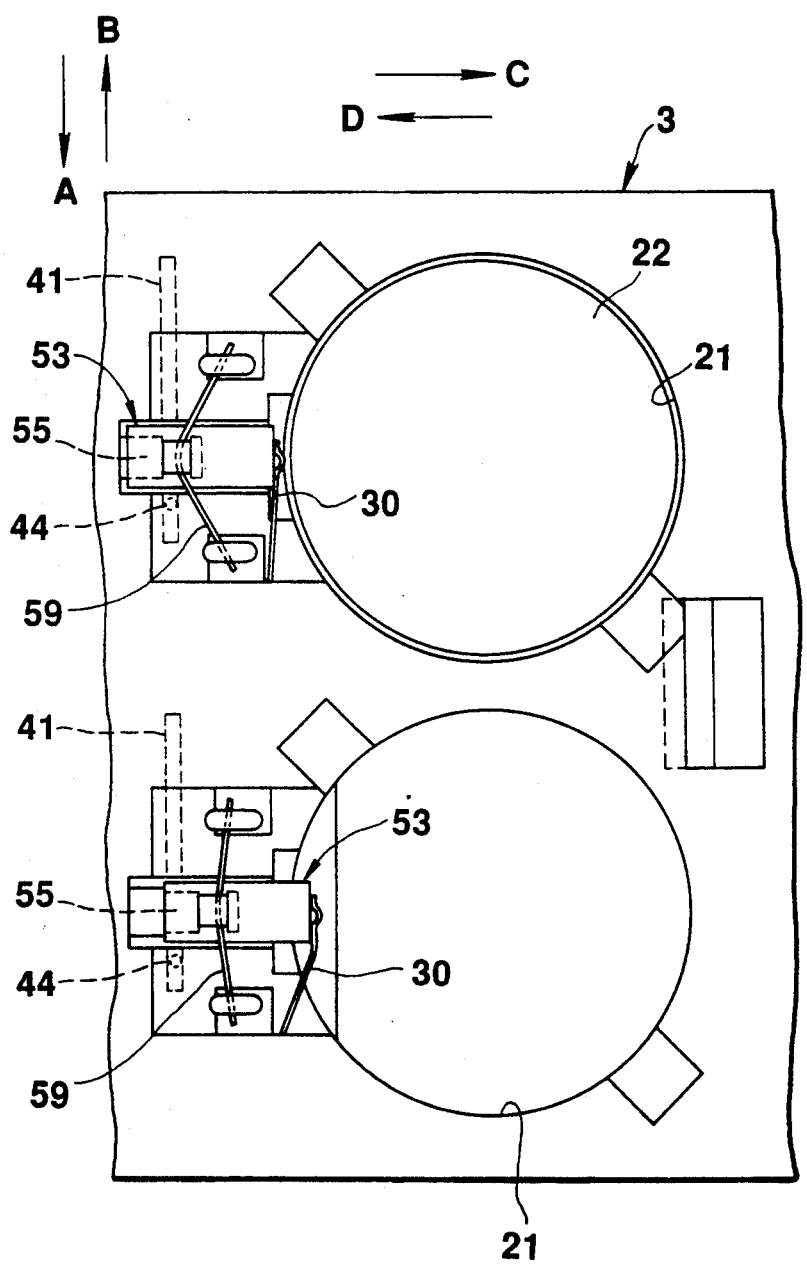
FIG. 9 is an enlarged bottom view schematically showing a state in which only one of the two button-type batteries for the main circuit is detached from the two battery accommodating portions of in FIG. 7.

When only one of the two button-type batteries 22 for the main circuit is removed from its corresponding accommodating hole 21, one projection 55 of only the first lock member 53 which corresponds to the battery-removed hole 21 shuts off its corresponding first guide groove 41, as shown in FIG. 9. In this situation, the first pin 44 of the screw blinding plate 43 which is in the corresponding one of the first guide grooves 41 strikes against the projection 55 of the above mentioned urged first lock member 53 to thereby prevent the screw blinding plate 43 from being moved in the direction B. Therefore, the screw blinding plate 43 cannot be moved in the direction B in the exchanging operation of the two button-type batteries 22 with new ones, and the memory backup button-type battery 32 cannot be exchanged with new one.

When the exchanging operation of the two button-type batteries 22 with new ones is finished, the circumferential surfaces of the two new button-type batteries urges the free ends of the corresponding negative plates 30, so that the two first lock members 53 are moved in the direction D against the urging force of the spring rods 59, thereby aligning the grooves 57 of the two first lock members 5 with the two first grooves 41, as shown in FIG. 7. In this situation, the screw blinding plate 43 is allowed to move in the direction B.

When the power switching slider 12 is returned to the center position (battery unexchangeable position) together with the screw blinding plate 43, the power switch of the small-sized electronic appliance is turned on and the supply of current is started from the two new button-type batteries 22 for the main circuit to the control portion.

When the memory backup button-type battery 32 is to be exchanged with new one in the aforementioned battery accommodating structure, at first the power switching slider 12 is slid to the (B) direction moved position (memory backup battery exchangeable position) together with the screw blinding plate 43, as shown in FIG. 5. In this situation, the screw blinding plate 43 still covers the two screws 28, which serve to fix the battery pressing plate 23, so that the two screws 28 can not be unscrewed, and the blinding pale 23 is removed over the screw 38, which serves to fix the battery pressing plate 33, so that the screw 38 can be unscrewed. When the power switching slider 12 is located at the (B) direction moved position, the power switch is turned off so that the two button-type batteries 22 for the main circuit are shut off from the control portion.

Figure 6:
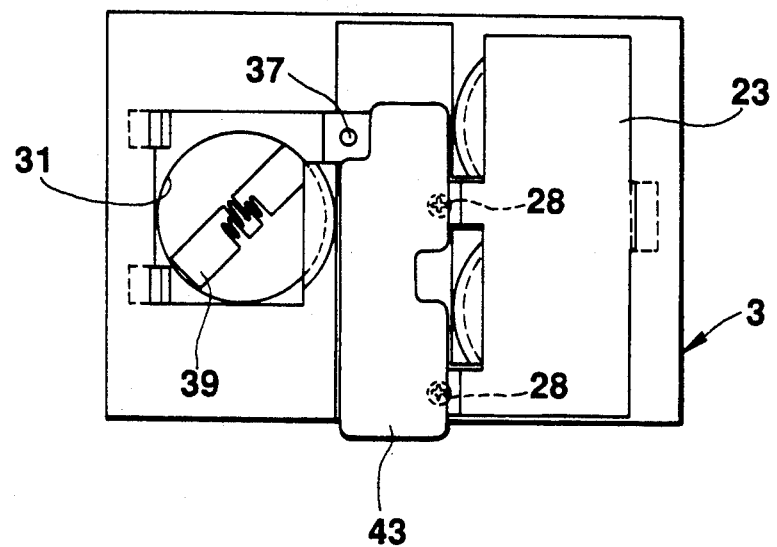
FIG. 6 is a plan view schematically showing a state in which a button-type battery for backing up the memory is detached from the battery accommodating structure of FIG. 5.

Next, as shown in FIG. 6, the screw 38 is unscrewed and the battery pressing plate 33 is removed from the intermediate case 3, thereby enabling the memory backup button-type battery 32 to be exchanged with new one. As described above, current is supplied from the two main circuit button-type batteries 22 to the memory portion, in this situation, independently of whether or not the memory backup button-type battery 32 is accommodated in the second battery accommodating hole 31. In this situation that the memory backup button-type battery 32 is removed from the second battery accommodating hole 31, the second lock member 54 which corresponds to the second battery accommodating hole 31 for the button-type battery 32 is moved in the direction D by the urging force of the spring rod 59 and the projection 55 on the second lock member 54 shuts off the second guide groove 42. In this situation, the second pin 45 of the screw blinding plate 43 which is inserted in the second guide groove 42 strikes against the projection 55 on the second lock member 54, thereby preventing the screw blinding plate 43 from being moved in the direction A. In the exchanging operation of the memory backup button-type battery 32 with new one, therefore, the screw blinding plate 43 cannot be moved in the direction A so that the two main circuit button-type batteries 22 cannot be exchanged with new ones.

When the exchanging operation of the memory backup button-type battery 32 with new one is finished, the circumferential surface of the new button-type battery 32 presses the free end of the negative plate 40 in the second battery accommodating hole 31 for the button-type battery 32 so that the second lock member 54 is moved in the direction C against the urging force of the spring rod 59 to thereby align the groove 57 on the second lock member 54 with its corresponding second guide groove 42. In this situation, the screw blinding plate 43 is allowed to move in the direction A.

When the power switching slider 12 is returned to the center position (battery unexchangeable position) together with the screw blinding plate 43, the power switch is turned on and the supply of current from the two main circuit button-type batteries 22 to the control portion is started.

Although the two first battery accommodating holes 21 for the two main circuit button-type batteries 22 and the second battery accommodating hole 31 for the memory backup button-type battery 32 are located on both sides of the screw blinding plate 43 the above-described embodiment, they may be located on only one side of the screw blinding plate 43.

Further, the battery accommodating structure of the present invention can be used for such electronic appliances that use only one button-type battery 22 for their main circuit.

Still further, the battery pressing plates 23 and 33 may be fixed to the intermediate case 3 by elastic pieces formed integral with the intermediate case 3 instead of using the screws 28 and 38.

Still further, other various changes and modifications can be made to the present invention without departing from the spirit and scope of the present invention.

According to the present invention as described above, the battery or batteries accommodated in one of the first and second battery accommodating holes cannot be exchanged with new one or ones while the battery or batteries accommodated in the other of the first and second battery accommodating holes is exchanged with new one or ones. This can prevent all of the plural batteries from being simultaneously removed from their accommodating holes so that data stored in the memory means in the small-sized electronic appliances, the memory means must being backed up, is prevented from being mintakenly erased at the time of battery exchange.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A battery accommodating structure comprising:
a casing;
first and second recess means formed of recesses in the casing, for accommodating respective batteries therein;
first and second plate members detachably attached to the casing to prevent the batteries from being removed from the first and second battery accommodating recess means; and
release means movable between a first position where the first plate member can be detached from the casing, a second position where the second plate member can be detached from the casing, and a third position where neither of said first and second plate members can be detached from the casing.

2. The battery accommodating structure according to claim 1, wherein the release means is attached to a power switch of an appliance which uses the battery accommodating structure, and wherein the third position of the release means corresponds to a turn-on position of the power switch and the first and second positions of the release means correspond to a turn-off position of the power switch.

3. The battery accommodating structure according to claim 2, further comprising:
a first lock means for preventing the release means from moving from the first position to the second position when the release means is located at the first position and no battery is accommodated in the first battery accommodating recess means; and
a second lock means for preventing the release means from moving from the second position to the first position when the release means is located at the second position and no battery is accommodated in the second battery accommodating recess.

4. The battery accommodating structure according to claim 3, wherein
the first and second plate members are attached to the casing by screws, and
a release means exposes the screw for the first plate member but covers the screw for a second plate member when the release means is located at the first position, and exposes the screw for the second plate member but covers the screw for the first plate member when the release means is located at the second position.

5. The battery accommodating structure according to claim 4, wherein the battery accommodated in the first battery accommodating recess means is used for a main circuit of an appliance which uses the battery accommodating structure, and the battery accommodated in the second battery accommodating recess means is used for backing up a memory of the appliance.

6. The battery accommodating structure according to claim 5, wherein the release means can further move to a third position where the power switch is turned on, and the release means prevents both of the first and second plate members from being released.

7. The battery accommodating structure according to claim 3, wherein the release means has projecting portions, the casing is provided with guide grooves into which the projecting portions are inserted, and the first and the second lock means have means for shutting off the guide grooves when no battery or batteries is accommodated in the corresponding first or second battery accommodating means.

* * * * *